United States Patent [19]

Odemer et al.

[11] Patent Number: 5,372,514

[45] Date of Patent: Dec. 13, 1994

[54] HOLDING DEVICE FOR BATTERY-POWERED ELECTRICAL APPLIANCES WITH COUPLING MEANS FOR CONNECTION TO A SOURCE OF POWER

[75] Inventors: Michael Odemer, Frankfurt am Main; Roland Ullmann, Offenbach-Rumpenheim; Bernhard Wild, Königstein/Ts., all of Germany

[73] Assignee: Braun Aktiengesellschaft, Frankfurt, Germany

[21] Appl. No.: 992,147

[22] Filed: Dec. 17, 1992

[30] Foreign Application Priority Data

Dec. 20, 1991 [DE] Germany .............................. 4142159

[51] Int. Cl.⁵ .............................................. H01R 13/44
[52] U.S. Cl. ..................... 439/136; 439/929; 320/2
[58] Field of Search ........ 439/136, 142, 144, 146–148, 439/366, 923, 929; 320/2

[56] References Cited

U.S. PATENT DOCUMENTS

| 3,143,697 | 8/1964 | Springer ................ 439/929 |
| 3,348,116 | 10/1967 | Freeman et al. ........... 439/929 |
| 4,536,694 | 8/1985 | McCarty et al. . |
| 4,829,226 | 5/1989 | Nakamura et al. . |
| 4,943,703 | 7/1990 | Duxbury ................ 439/929 |
| 5,030,902 | 7/1991 | Mattinger et al. .......... 439/929 |
| 5,075,615 | 12/1991 | Dantis ................... 439/929 |

FOREIGN PATENT DOCUMENTS

| 1436255 | 3/1966 | France . |
| 1671949 | 11/1967 | Germany . |
| 7112319 | 1/1972 | Germany . |
| 8012410 | 8/1980 | Germany . |
| 2072438 | 9/1981 | United Kingdom . |

OTHER PUBLICATIONS

Bosch-Kleingerate, Prospectus 1980.

*Primary Examiner*—P. Austin Bradley
*Attorney, Agent, or Firm*—Fish & Richardson

[57] ABSTRACT

The invention is directed to a holding device for battery-powered electrical appliances as, for example, shavers, hair cutters and the like, which include at least one rechargeable storage cell, in which the storage cell of the electrical appliance is connected to a source of power for recharging purposes by a coupling means establishing electrical contact. In addition to providing the retaining members, the holding device includes a coupling means for establishing electrical contact between the electrical appliance one the one side and an electrical lead or a source of power on the other side, and an interlocking device arranged between the electrical appliance and the coupling means such as to selectively permit an electrical connection to be made between the electrical appliance and the coupling means. Following removal of an interlocking device, for example, by hand, the connector plug of the electrical appliance may be plugged into the connector socket of the coupling means.

24 Claims, 3 Drawing Sheets

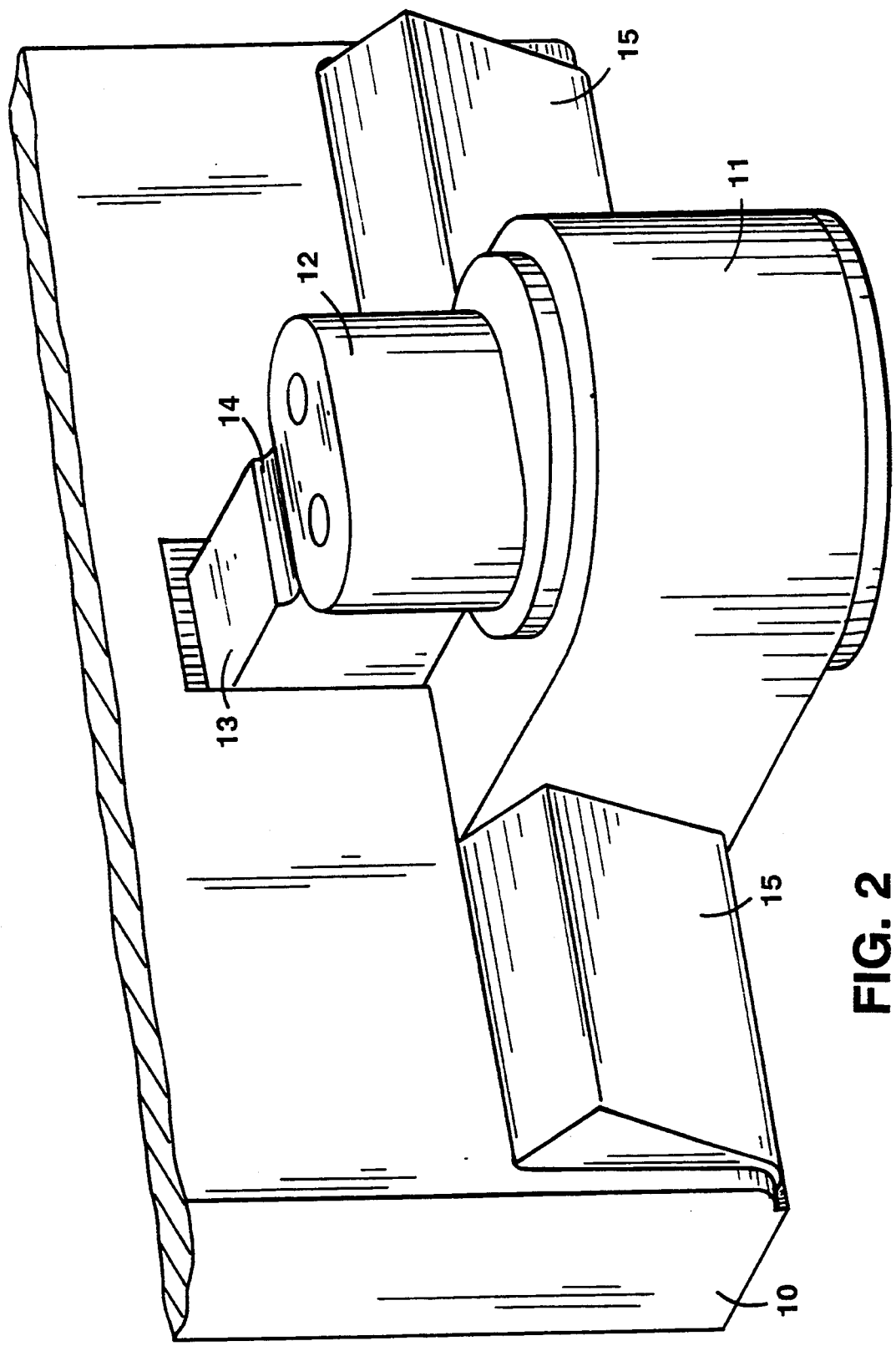

HOLDING DEVICE FOR BATTERY-POWERED ELECTRICAL APPLIANCES WITH COUPLING MEANS FOR CONNECTION TO A SOURCE OF POWER

This invention relates to a holding device for battery-powered electrical appliances as, for example, shavers, hair cutters, massagers, toothbrushes, drills, hand screwdrivers and the like, which include at least one rechargeable storage cell. In addition to providing the retaining members, the holding device is equipped with a coupling means for establishing electrical contact between the electrical appliance and a source of power for the purpose of recharging the storage cell.

Holding devices for electrically powered small appliances are known in the art (DE 80 12 410 U1), for example, for shavers, in which the battery-powered shaver can be placed down vertically in positive engagement with a suitable receptacle, with contact pins provided on the underside of the shaver engaging in a mating connector socket located on the appliance holder. Opposite the coupling end for the shaver, the connector socket structure provides a connector plug. A power cord socket may be connected to this connector plug. The appliance holder enables a battery-powered appliance, which in this arrangement is a shaver, to be used independently of an electrical outlet, that is, cordless, and the storage cell of the electrical appliance to be recharged within the appliance holder without further provisions during periods of non-use.

The advantage of this device is particularly that an electrical appliance can be recharged continually, causing the storage cell of the electrical appliance to be in a fully charged condition practically each time it is used. On the other hand, in these known appliance holders the electrical appliances and thus their rechargeable storage cells remain connected to the electrical power supply for an unnecessarily long period of time. Therefore, in the use of such a device, the provision of an overcharge protection for the storage cell is a must. Yet, also with an overcharge protection built in, a permanent low current flow to the cell cannot be avoided. While such conditions are not advantageous in the conventional nickel-cadmium batteries, they are not detrimental either. However, when substituting, for example, cadmium-free nickel hydride cells for the nickel-cadmium cells, permanent recharging, no matter how small, may damage and in the worst case overheat and eventually destroy the nickel hydride cells. A recommendation would be necessary instructing the user to plug the power cord to the appliance holder only when it is desired to recharge the storage cell. Precisely such user instructions present the problem that they are not observed or that the power cord may be misplaced during the period of non-use, which, overall, is not user friendly.

It is an object of the present invention to provide a holding device for batter-powered electrical appliances as, for example, hair cutters, massagers, toothbrushes, drills, hand screwdrivers and the like, which include at least one rechargeable storage cell, in which the holding device is comprised of retaining members and a coupling means for charging the storage cell of the electrical appliance, with the coupling means comprising one or several connector plugs and/or connector sockets for establishing electrical contact between the electrical appliance on the one side and a source of power on the other side, without necessarily involving permanent recharging of the storage cell. This object is accomplished by the present invention in that recharging of the storage cell of the electrical appliance is interruptible without disconnecting the connection between the holding device and the source of power.

In a further feature, the object of the invention is suitably accomplished by means of a holding device providing, in addition to the retaining members, a coupling means for establishing electrical contact between the electrical appliance on the one side and an electrical lead or a source of power on the other side, with a mechanically movable interlocking device being provided which is adapted to be placed between the electrical appliance and the coupling means such as to prevent an electrical connection from being made between the electrical appliance and the coupling means.

The interlocking device is advantageously movably connected with the holding device. Loosely inserted interlocking devices as, for example, caps placed over the coupling means, may also be considered; however, they have the disadvantage that they may become lost.

Using the same basic elements as in the aforementioned solution, the holding device may include guiding means for supporting the electrical appliance, which provide at least two positions for holding the electrical appliance within the holding device, electrical contact of the electrical appliance with the coupling means being made in only one position.

In a further solution, the holding device, in using basic elements similar to those in the aforementioned solutions, includes a manually actuatable electric switch selectively releasing and interrupting the flow of current within the coupling means.

Any one of the solutions set forth ensures a safe holding function for the electrical appliance during periods of non-use, with the option to establish electrical contact of the rechargeable storage cell of the electrical appliance to a source of power through a coupling means. In all arrangements, the electrical lead, for example, a cord, may always remain connected with an electrical outlet or some other source of power and the holding device. This eliminates the need for frequent plugging of the attachment socket of the power cord to the coupling means which may cause, for example, cord breakage in the proximity of the plug when used frequently without exercising sufficient care.

It is a particular advantage that the user may store the electrical appliance in the holding device such that no connection exists with the coupling means and thus with the source of power. It is not until the user notices that the electric storage cell is materially discharged which is indicated, for example, by suitable visual or audible means on the electrical appliance, that he may place the electrical appliance in the holding device such as to connect it electrically to the source of power via the coupling means, or he establishes the electrical connection intentionally by actuation of the switch.

Further advantages and details will become apparent from the subsequent description of embodiments and the accompanying drawings illustrating some preferred features.

In the drawings,

FIG. 2 is an interlocking tongue structure for a holding device actuatable on either side;

Figure 1:
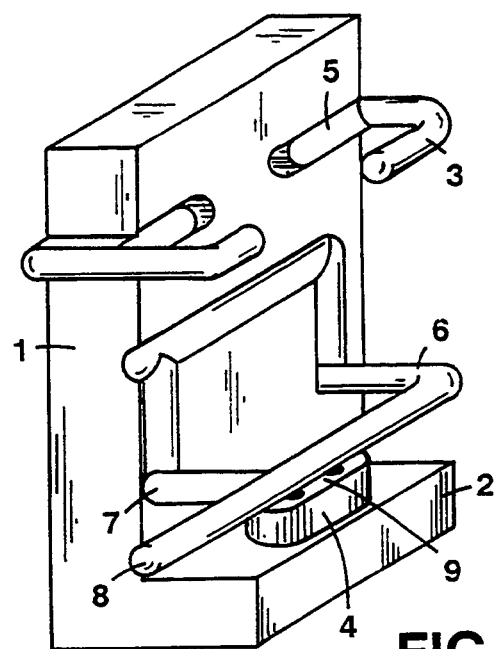
FIG. 1 is a holding device incorporating a mechanically actuatable interlocking clip structure.

The holding device of FIG. 1 is comprised of a wall structure 1, a lower supporting structure 2 connected therewith, and retaining members 3. This holding device may be placed down on a surface or it may be mounted on a wall in a manner known per se. The lower supporting structure 2 includes a shoulder 9 with a connector socket 4 engaged by the contact pins of an electrical appliance not shown in this embodiment. An electrical appliance as, for example, a shaver which is placed down in this holding device is thus held by both the shoulder 9 with the connector socket 4 and the retaining members 3. The bracket-type retaining members 3 are slidably arranged in the wall structure 1 in guideways 5 provided at either end thereof, such as to enable them to conform to various electrical appliances intended to be held in the holding device.

The connector socket 4 is part of a coupling means including connector pins underneath the supporting structure 2 for insertion of a power cord socket which in turn is connected to the electrical supply. When the electrical appliance is replaced in the holding device without the interlocking clip structure 6 described in the following, an electrical connection will be established between the rechargeable storage cell in the electrical appliance and the source of power, causing the storage cell to be recharged. In a known manner, rechargeable electrical appliances possess protective devices avoiding overcharging. Yet, the appliance remains at all times connected to the power source supplying continually a low current. Such minor and unavoidable recharging may, over time, overheat and eventually damage the storage cells.

In accordance with the present invention, the holding device includes an interlocking clip structure 6 rotatably carried in the wall structure 1 in hinges 7. The clip structure 6 is mounted such as to drop forward under the influence of gravity, coming to rest directly on the shoulder 9, that is, the connector socket 4. When the electrical appliance is replaced in the holding device, it will always come to sit on the clip structure 6. A connection between the contact pins in the electrical appliance and the connector socket 4 will thus be avoided. This prevents recharging of the storage cell in the electrical appliance. It is only after the user of the electrical appliance has determined, for example, by means of a pilot light, that the storage cell of the electrical appliance needs recharging, that he has the possibility to swing the clip structure 6 into the plane of the wall structure 1 by actuating a control element 8, which subsequently enables him to place the electrical appliance directly down onto the shoulder 9 to connect it to the connector socket 4. In this position, the storage cell of the electrical appliance is connected to the power source, being recharged until the appliance is again withdrawn from the holding device. Advantageously, the bottom end of the electrical appliance is configured such as to have a safe lateral support on the clip structure 6.

With this holding device of the invention, it is possible to store the electrical appliance in the holding device without the need for additional manipulation and without necessarily contacting the rechargeable storage cell with a power source. This eliminates the danger involved in the undesirable feature of having to constantly charge the storage cell, and its potential detrimental effects. The cable, not shown in the drawings, between the coupling means and the power source may remain connected to the holding device at all times. Recharging the storage cell of the electrical appliance will occur only when the clip structure 6 is intentionally moved away from the connector socket 4.

FIG. 2 shows an interlocking device of the invention using an interlocking tongue structure 13. The holding device incorporates again a wall structure 10 to which a supporting structure 11 is attached. Integrally formed with the supporting structure 11 is an electric coupling means including at the top a connector socket 12 and at the bottom a connector plug not shown in the Figure. Suitable for introduction in the connector plug in a known manner is an attachment socket connected at its other end to a source of power through a power cord. The tongue structure 13 is mounted in the wall structure 10, bearing against the connector socket 12 under spring action. In its plane of contact with the connector socket 12, a recess 14 is embedded in the tongue structure 13 for engagement with a complementary part on the electrical appliance when replaced in the holding device to provide secure positional orientation. When the electrical appliance is stored in the holding device, it will sit on the tongue structure 13, its plug being then unable to contact the connector socket 12. When the user of the electrical appliance wishes to recharge the storage cell, he will be required to push one of the control elements 15 provided on either side of the supporting structure 11 in order to cause the tongue structure 13 to be moved away from the connector socket 12 into the interior of the wall structure 10.

The control elements 15 are connected with the spring-loaded tongue structure 13. Only after the tongue structure 13 is moved away from the connector socket 12 can the electrical appliance be engaged with the connector socket 12, establishing electrical contact between the connector plug of the electrical appliance and the connector socket 12. The rechargeable storage cell of the electrical appliance will then be recharged. As soon as the electrical appliance is again removed from the holding device, the tongue structure 13 will return to its interlocking position by spring action. Also in this embodiment, the user is required to release the charging operation of the storage cell intentionally by actuating one of the control elements 15.

Figure 3:
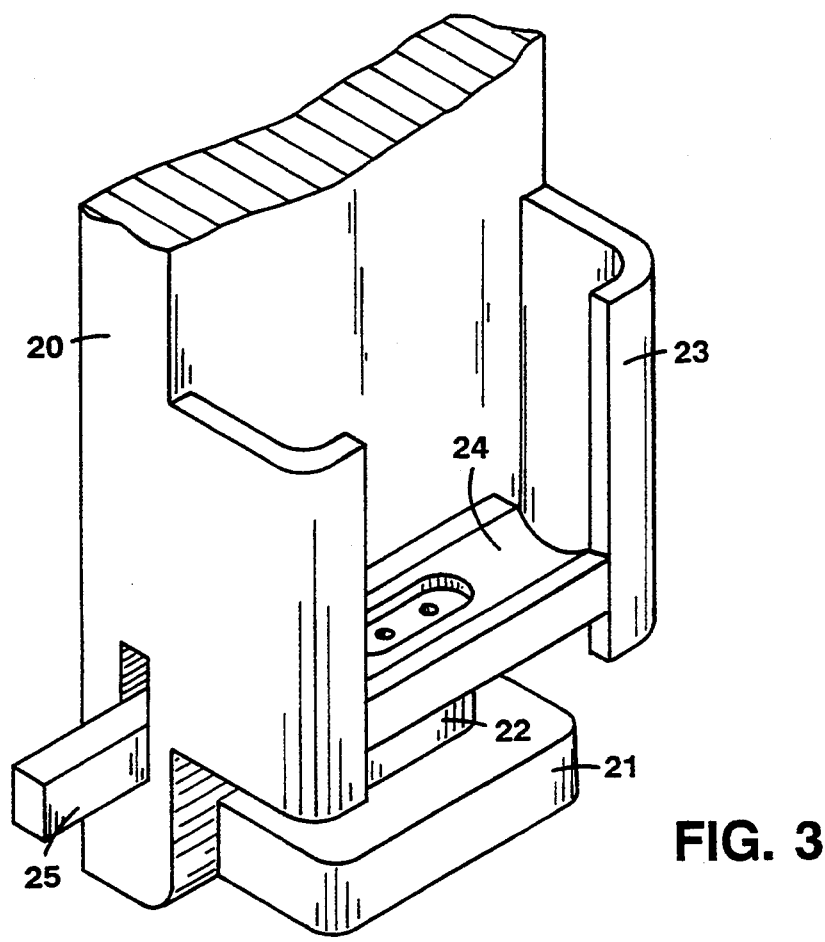
FIG. 3 is a holding device in which the interlocking member is moved axially to the connector socket.

FIG. 3 shows a holding device incorporating a wall structure 20, a supporting structure 21, and retaining members 23. A connector socket 22 is arranged in a coupling means integrally formed with the supporting structure 21 and having on its other side a connector plug not shown. The connector socket 22 is enclosed by an interlocking bearing member 24. The interlocking bearing member 24 is spring-mounted in the wall structure 20 by means of an elbow lever and can be moved up and down relative to the connector socket 22 by means of a control element 25. The interlocking bearing member 24 is configured such as to provide a good support for the electrical appliance when replaced in the holding device. Pushing the control element 25 down causes an upward movement of the interlocking bearing member 24, preventing contact to be established between the connector plug in the electrical appliance and the connector socket 22. Imparting an upward push to the control element 25 moves the interlocking bearing member 24 downward relative to the connector socket 22, causing the connector plug in the electrical appliance to be introduced into the connector socket 22 when the electrical appliance is replaced. The storage cell in the electrical appliance will then be charged.

Figure 4:
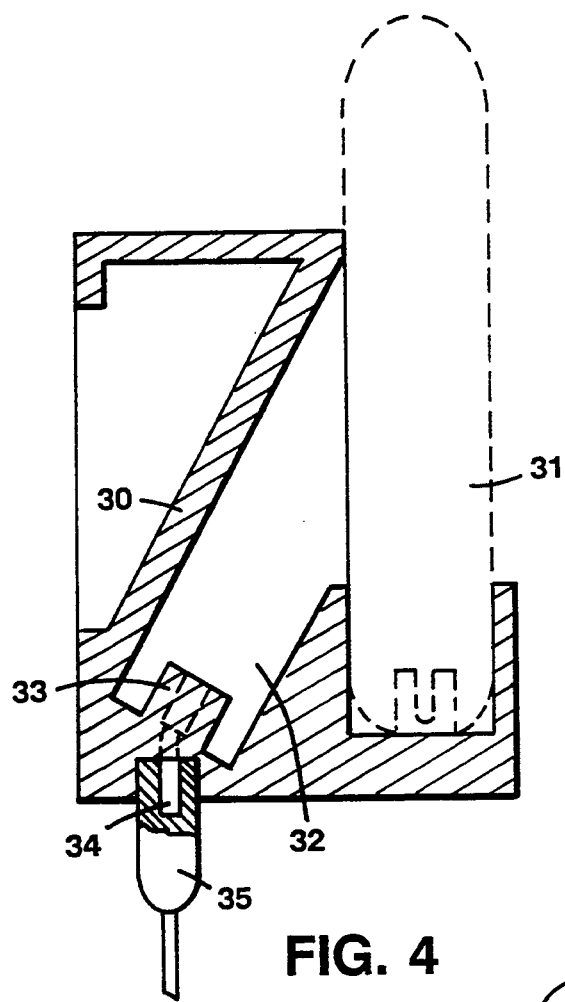
FIG. 4 is a holding device providing different storage positions for the battery-operated electrical appliance.

FIG. 4 shows a holding device enabling the electrical appliance to be selectively stored in two positions. Molded into the housing 30 of the holding device which is preferably an injection molded plastic part are a first receptacle 31 and a second receptacle 32. The first receptacle 31 has no connection to a source of power. By contrast, the bottom of the receptacle 32 accommodates a coupling means for making electrical contact between the storage cell of the electrical appliance and a power source. This coupling means includes a connector socket 33 within the receptacle 32 and a connector plug 34 on its other side. An attachment socket 35 of a power cord may be pushed onto the connector plug 34. With this holding device of the invention, the user has the option to store the electrical appliance vertically using the first receptacle 31, or in an inclined position using the second receptacle 32. Whilst the storage cell in the electrical appliance is not contacted with a power source when receptacle 31 is used, electrical contact will be established when the electrical appliance is stored in receptacle 32.

In a modification of the solution shown in FIG. 4, the electrical appliance is stored in a receptacle similar to receptacle 31 when recharging of the storage cell is not desired, while, when it is desired to recharge the storage cell, the electrical appliance is turned about its axis, preferably through 90 degrees, to be subsequently placed in a receptacle intersecting, and lying at an elevation deeper than, receptacle 31 and having integrally formed therein a connector socket similar to connector socket 33. When the electrical appliance is stored in this receptacle, the connector plug of the electrical appliance will make contact with the connector socket, and the storage cell will be recharged.

Figure 5:
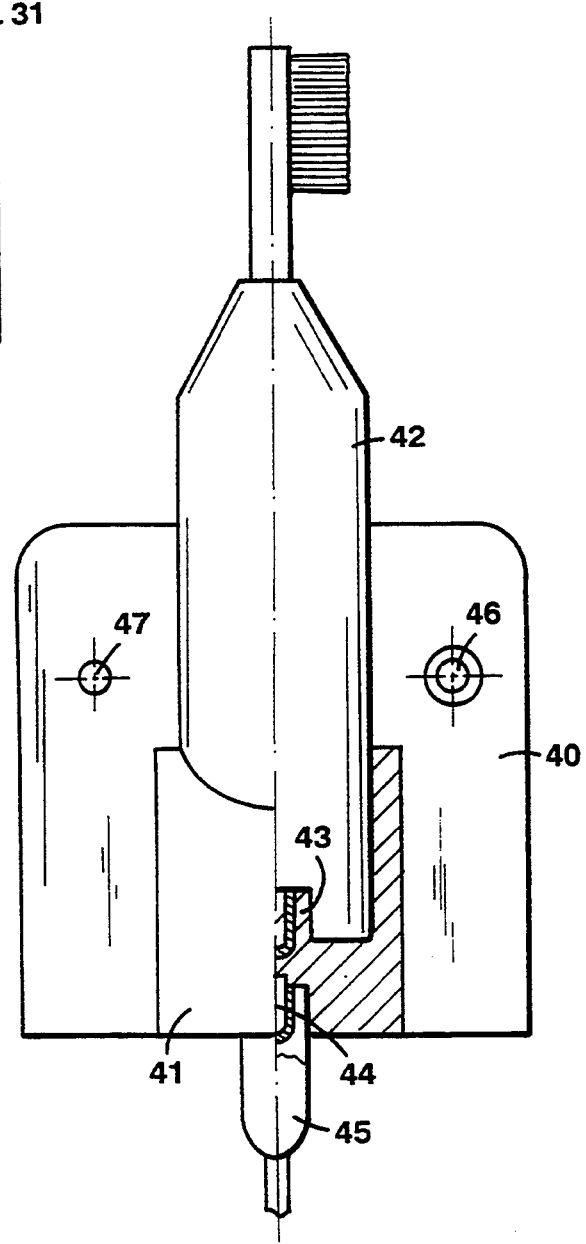
FIG. 5 is a holding device incorporating an electric switch.

FIG. 5 shows a holding device for an electric toothbrush. A wall structure 40 incorporates a sleeve-type supporting structure 41 into which the electric toothbrush 42 is placed. Integrally formed within the supporting structure 41 for contacting the toothbrush 42 is a connector socket 43 and on the other side a connector plug 44 for contacting with an attachment socket 45 of a power cord.

In this arrangement, it is an essential feature or the invention that the connector socket 43 and the connector plug 44 can be connected to each other only by means of an electric switch, in the embodiment shown by a pushbutton switch 46. The individual electrical connections are not shown in more detail for clarity of illustration. Further connected in the circuit between the connector socket 43 and the connector plug 44 by means of the pushbutton switch 46 is a pilot light 47 providing a visual indication when the storage cell of the toothbrush 42 is being charged. When the charging condition of the storage cell of the toothbrush 42 is normal, the toothbrush 42 is merely stored in the sleeve 41. An electrical contact with a source of power will not be established because the pushbutton switch 46 has not been actuated. Only after the user has determined that the storage cell of the toothbrush 42 requires recharging will he actuate the pushbutton switch 46 after replacing the toothbrush 42 in the sleeve 41, thereby establishing the electrical connection between the connector socket 43 and the connector plug 44. At the same time, the pilot light 47 will go on, reminding the user that the toothbrush 42 is being recharged. It would be suitable to provide a further device in which the switch 46 goes to power off whenever the toothbrush 42 is removed (not shown in the drawing).

All solutions of the present invention show that the holding devices are configured such that the storage cells are not recharged when the electrical appliances are stored normally. Only when the user, in performing an intentional operation, deactivates the interlocking members provided on the holding device or establishes the flow of current intentionally, will the storage cell of the electrical appliance be contacted with the electric coupling means or a power source. These solutions prevent to a high degree of safety overcharging of the storage cells and thus their damage. On the other hand, the cord connecting the holding device to the power source, for example, to an outlet, may remain connected to the holding device at all times. This thus affords a highly user-friendly storage, avoiding in the worst case cord breaks due to frequent plugging and unplugging of the attachment plugs.

We claim:

1. A holding device for a battery-powered electrical appliance which include at least one rechargeable storage cell, said holding device comprising retaining members for holding said battery-powered electrical appliance, and a coupling means including one or several connector plugs and/or connector sockets for establishing electrical contact between the electrical appliance on the one side and a source of power on the other side, wherein recharging of the storage cell of the electrical appliance when held by the retaining members is interruptible without disconnecting the connection between the holding device and the source of power.

2. The holding device as claimed in claim 1 further comprising a switch to which the coupling means is electrically connected, wherein said switch is actuatable manually and selectively releases and interrupts a flow of current.

3. The holding device as claimed in claim 1 further comprising a mechanically movable interlocking device which separates the coupling means from the electrical appliance or covers it, such as to prevent an electrical connection from being made between the electrical appliance and the coupling means, said interlocking device being manually removable from the coupling means such as to allow electrical contact between the electrical appliance and the coupling means.

4. The holding device as claimed in claim 3, wherein the interlocking device is manually movable.

5. The holding device as claimed in claim 3 wherein the interlocking device is spring-loaded and in a locked position covers the coupling means relative to the electrical appliance.

6. The holding device as claimed in claim 3 wherein the interlocking device comprises an interlocking clip structure pivotally mounted in the holding device.

7. The holding device as claimed in claim 3 wherein the interlocking device comprises an interlocking tongue structure pivotally mounted in the holding device.

8. The holding device as claimed in claim 3 wherein the electrical appliance sits on the interlocking device when the interlocking device is in an activated position.

9. The holding device as claimed in claim 3 wherein the interlocking device includes at least one control element.

10. The holding device as claimed in claim 3, wherein the interlocking device is movably mounted in the holding device.

11. The holding device as claimed in claim 10 wherein the interlocking device is mounted such as to cover in a locked position the coupling means relative to the electrical appliance under the influence of gravity.

12. The holding device as claimed in claim 3 wherein the coupling means is fixedly disposed in the holding device, the interlocking device is an interlocking bearing member enclosing the coupling means and slidably and lockably arranged relative to the coupling means in an axial direction of the coupling members, and the electrical appliance sits on the interlocking bearing member such as to enable the electrical appliance to be selectively contacted with the coupling means by displacement of the interlocking bearing member.

13. The holding device as claimed in claim 12 wherein the interlocking device includes a control element each on the left and right hand side of the holding device, when viewed from an operator's end.

14. The holding device as claimed in claim 1, further comprising guiding means for supporting the electrical appliance, to enable the electrical appliance to be held in at least two positions within the holding device, electrical contact of the electrical appliance with the coupling means being made in only one of said at least two positions.

15. The holding device as claimed in claim 14, further comprising first and second receptacles provided as guiding means, wherein said first receptacle holds the electrical appliance vertically and has no coupling means, and wherein said second receptacle includes the coupling means and holds the electrical appliance in an orientation that deviates from a vertical orientation, said orientation enabling the electrical appliance to contact the coupling means.

16. The holding device as claimed in claim 14, wherein the retaining members hold the electrical appliance in a vertical orientation in at least two different positions turned about its vertical axis, with the electrical appliance being able to contact the coupling means in only one position.

17. The holding device as claimed in claim 1 further comprising a wall structure on which the coupling means is fixedly disposed, and an interlocking device which prevents an electrical connection from being made between the electrical appliance and the coupling means, and wherein the retaining members enclose the appliance at least in part.

18. The holding device as claimed in claim 17 wherein the coupling means includes a connector socket on a side proximate to the electrical appliance and a connector plug on a side opposite from the proximate side.

19. The holding device as claimed in claim 17 wherein the interlocking device is arranged or mounted in the wall structure or in the supporting structure.

20. The holding device as claimed in claim 17 further comprising a supporting structure and wherein the coupling means is arranged in the supporting structure on the wall structure.

21. The holding device as claimed in claim 20 wherein the coupling means is integrally formed in the supporting structure.

22. The holding device as claimed in claim 17 wherein the retaining members are slidably or exchangeably arranged in the holding device and can selectively be conformed, or conform, to different electrical appliances.

23. The holding device as claimed in claim 22 wherein the retaining members are bracket structures and are slidably arranged in the wall structure of the holding device.

24. The holding device as claimed in claim 22 wherein the retaining members are lockable in a plurality of positions.

* * * * *